United States Patent
Kerry-Tyerman et al.

(10) Patent No.: US 9,122,666 B2
(45) Date of Patent: Sep. 1, 2015

(54) SYSTEMS AND METHODS FOR CREATING AN ANNOTATION FROM A DOCUMENT

(75) Inventors: Jonathan Kerry-Tyerman, Berkeley, CA (US); Sanjay Sharma, Mason, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 91 days.

(21) Appl. No.: 13/177,884

(22) Filed: Jul. 7, 2011

(65) Prior Publication Data

US 2013/0013999 A1 Jan. 10, 2013

(51) Int. Cl.
G06F 17/21 (2006.01)
G06F 17/24 (2006.01)
G06Q 10/10 (2012.01)
G06Q 50/18 (2012.01)

(52) U.S. Cl.
CPC .............. *G06F 17/241* (2013.01); *G06Q 10/10* (2013.01); *G06Q 50/18* (2013.01)

(58) Field of Classification Search
CPC .................... G06F 17/30707; G06F 17/30867; G06F 17/30728; G06F 17/30864; G06F 17/27; G06F 17/278; G06F 17/30011; G06F 17/30554; G06F 17/241; G06Q 10/10; G06Q 50/18
USPC .......... 715/205, 208, 230–232, 255, 256, 266
See application file for complete search history.

(56) References Cited

U.S. PATENT DOCUMENTS

| | | | |
|---|---|---|---|
| 5,794,236 A | 8/1998 | Mehrle | |
| 6,289,342 B1 * | 9/2001 | Lawrence et al. | 1/1 |
| 7,028,259 B1 * | 4/2006 | Jacobson | 715/236 |
| 7,062,498 B2 | 6/2006 | Al-Kofahi et al. | |
| 7,111,230 B2 | 9/2006 | Euchner et al. | |
| 7,370,269 B1 | 5/2008 | Prabhu et al. | |
| 7,506,246 B2 | 3/2009 | Hollander et al. | |
| 7,779,347 B2 | 8/2010 | Christiansen et al. | |
| 7,937,386 B2 | 5/2011 | Barrett et al. | |
| 8,140,505 B1 * | 3/2012 | Jain et al. | 707/706 |
| 2002/0091679 A1 | 7/2002 | Wright | |
| 2003/0046307 A1 | 3/2003 | Rivette et al. | |
| 2003/0214528 A1 | 11/2003 | Pierce et al. | |
| 2004/0163042 A1 | 8/2004 | Altman | |
| 2004/0193596 A1 * | 9/2004 | Defelice et al. | 707/5 |
| 2006/0005113 A1 * | 1/2006 | Baluja et al. | 715/501.1 |
| 2006/0053364 A1 | 3/2006 | Hollander et al. | |
| 2007/0074107 A1 | 3/2007 | Lessing et al. | |

(Continued)

OTHER PUBLICATIONS

Shepard, "How to Shepardize", Puplisher: LexisNexis, Published: 2003, pp. 1-28.*

(Continued)

*Primary Examiner* — Wilson Tsui

(74) *Attorney, Agent, or Firm* — Dinsmore & Shohl LLP

(57) ABSTRACT

Embodiments disclosed herein include systems and methods for annotating a document. Some embodiments include searching a first electronic legal document to determine a first reference to a statute, identifying a portion of the first electronic legal document that includes the first reference to the statute, and copying the portion of the first electronic legal document for inclusion as an annotation to the statute. Similarly, some embodiments include compiling the portion of the first electronic legal document into the annotation to the statute, receiving a request for the statute and providing the annotation for display. Other embodiments are also disclosed herein.

20 Claims, 13 Drawing Sheets

(56) References Cited

U.S. PATENT DOCUMENTS

| | | | |
|---|---|---|---|
| 2007/0118794 A1 | 5/2007 | Hollander et al. | |
| 2007/0276854 A1* | 11/2007 | Gold | 707/101 |
| 2008/0086680 A1 | 4/2008 | Beckman | |
| 2009/0150827 A1* | 6/2009 | Meyer et al. | 715/810 |
| 2009/0204882 A1 | 8/2009 | Hollander et al. | |
| 2010/0241947 A1 | 9/2010 | Dahn et al. | |
| 2010/0245294 A1 | 9/2010 | Piersol et al. | |
| 2010/0251106 A1 | 9/2010 | Barrus et al. | |
| 2010/0257161 A1* | 10/2010 | Kemp et al. | 707/723 |
| 2010/0278453 A1 | 11/2010 | King | |
| 2011/0010397 A1 | 1/2011 | Kathpal | |
| 2011/0289105 A1 | 11/2011 | Hershowitz | |
| 2012/0166924 A1* | 6/2012 | Larson et al. | 715/205 |

OTHER PUBLICATIONS

International Search Report for PCT Application No. US/12/44886, dated Sep. 17, 2012, 13 pages.

* cited by examiner

UNITED STATES v JONES 100 S. CT 600 be infringement and not fair use. American Geophysical Union v Texaco. Inc. (1992, SD NY) 802 F Supp 1, and (1994, CA@ NY) 37 F3d 881, 32 USPQ2d 1545, reprinted as amd (1994, CA2 NY) 60 F3d 913. 35 USPQ2d 1513. 144 ALR Fed 745 and reh den, amd (1994, CA2 NY) 1994 US App BIGCO 36735. cert dismd (1995 516 US 1005, 133 L Ed 2d 486. 116 S Ct 592.

⊕ 48. Software

District court did not err in granting summary judgment against sheriff's department on its fair use defense under 17 USCS 107, part of Copyright Act, 17 USCS 101 et seq., in software company's copyright infringement action; notwithstanding fact that sheriff's department claimed that its computers were configured to limit number of users who could access licensed software, department's action of hard drive imaging software onto more computers than number of licenses was not protected by fair use defense; department's installation was not transformative, did not promote advancement of arts, was commercial in nature, and could seriously impact market for software company's product. Wall Data Inc. v L.A. County Sheriff's Dept 2006. CA9 Cal) 447 F3d 769,

UNITED STATES v JONES 100 S. CT 600 be infringement and not fair use. American Geophysical Union v Texaco, Inc. (1992, SD NY) 802 F Supp 1, and (1994, CA@ NY) 37 F3d 881, 32 USPQ2d 1545, reprinted as amd (1994, CA2 NY) 60 F3d 913, 35 USPQ2d 1513, 144 ALR Fed 745 and reh den, amd (1994, CA2 NY) 1994 US App BIGCO 36735, cert dismd (1995 516 US 1005, 133 L Ed 2d 486, 116 S Ct 592.

48. Software

District court did not err in granting summary judgment against sheriff's department on its fair use defense under 17 USCS 107, part of Copyright Act, 17 USCS 101 et seq., in software company's copyright infringement action; notwithstanding fact that sheriff's department claimed that its computers were configured to limit number of users who could access licensed software, department's action of hard drive imaging software onto more computers than number of licenses was not protected by fair use defense; department's installation was not transformative, did not promote advancement of arts, was commercial in nature, and could seriously impact market for software company's product. Wall Data Inc. v L.A. County Sheriff's Dept 2006. CA9 Cal) 447 F3d 769,

FIG. 4

FIG. 8

SYSTEMS AND METHODS FOR CREATING AN ANNOTATION FROM A DOCUMENT

BACKGROUND

1. Field

Embodiments provided herein generally relate to systems and methods for annotating a document, and particularly to systems and methods for annotating a statute with legal case law and/or other legal authority.

2. Technical Background

In many electronic searching systems, users can search and locate electronic documents, such as legal documents. Legal documents may include legal opinions (e.g., court opinions), briefs, motions, contracts, statutes, legal treatises, etc. While this search function may be beneficial for locating the desired document, oftentimes, the user also desires commentary and/or explanation of the electronic legal document. As an example, if a user locates a statute, the user often desires an annotation of that statute that provides court opinions that cite the statute, as well as commentary from the judge who rendered the opinion. The user may also desire commentary from other sources, such as treatises, internet sites, blogs, etc.

SUMMARY

In one embodiment, a method for annotating a document is disclosed. Some embodiments of the method include searching a first electronic legal document to determine a first reference to a statute, identifying a portion of the first electronic legal document that includes the first reference to the statute, and copying the portion of the first electronic legal document for inclusion as an annotation to the statute. Similarly, some embodiments include compiling the portion of the first electronic legal document into the annotation to the statute, receiving a request for the statute and providing the annotation for display.

In another embodiment, a system for annotating a document may include a memory component that stores logic for causing the system to receive a request for a second electronic document, determine whether a first electronic document references the second electronic document, and in response to determining that the first electronic document references the second electronic document, identify a portion of the first electronic document that references the second electronic document and retrieve the portion of the first electronic document for inclusion as an annotation into the second electronic document. In some embodiments, the logic causes the system to provide the annotation and provide a user-option to filter the annotation according to user-defined criteria.

In yet another embodiment, a system for creating annotations from a plurality of documents includes a memory component that stores logic for causing the system to search a first electronic document for determining a first reference to a second electronic document, identify a portion of the first electronic document that includes the first reference to the second electronic document, and copy the portion of the first electronic document for inclusion as a first annotation to the second electronic document. Similarly, in some embodiments the logic causes the system to compile the portion of the first electronic document into the first annotation to the second electronic document, search a third electronic document to determine a second reference to the second electronic document, and identify a portion of the third electronic document that includes the second reference to the second electronic document. In some embodiments, the logic causes the system to copy the portion of the third electronic document for inclusion as a second annotation to the second electronic document, compile the portion of the third electronic document into the second annotation to the second electronic document, and provide the first annotation and the second annotation for display.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts exemplary text from a first electronic legal document, such as a court opinion, according to one or more embodiments shown and described herein;

FIG. 4 depicts exemplary text from the first electronic legal document, indicating various portions that may be used for an annotation, according to one or more embodiments shown and described herein;

FIG. 8 depicts a front-end user interface for providing a plurality of sub-options to the filter by option, according to one or more embodiments shown and described herein;

DETAILED DESCRIPTION

Embodiments disclosed herein include systems and methods for annotating a document. More specifically, some embodiments may be configured to access a first electronic document, such as a court opinion to determine whether the first electronic document makes reference to a second electronic document, such as a statute. If the court opinion makes reference to the statute, the court opinion may be mined for other information that pertains to the statute. The various pieces information may be retrieved from the court opinion and may be compiled together to form an annotation to the statute. When a user searches for and locates the statute, the annotation may be additionally provided.

In some embodiments, a third electronic document (such as another court opinion) may be accessed and a determination may be made regarding whether the third electronic document refers to the statute. Once it has been determined that the third electronic document refers to the statute, a determination may be made regarding whether the third electronic document is duplicative of (or overrules) the first electronic document. Such a determination may be made based on whether the two documents include similar words, citations, parties, etc. If the word content or other characteristic of the two documents exceeds a predetermined threshold for similarity, the third electronic document may be excluded from being part of an annotation to the statute. Other mechanisms for determining whether the two documents are duplicative (or whether one overrules the other) may also be utilized, such as determining the courts that rendered the opinion, the date the opinions were issued, whether the two documents are linked, and/or other factors.

Additionally, some embodiments disclosed herein provide embodiments for an end-user electronic search functionality. In such embodiments, a user may perform a search for an electronic document, such as a statute. Accordingly, embodiments disclosed herein may locate the statute and determine whether any other electronic documents (such as legal opinions) refer to the statute. If so, an annotation may be created from the legal opinions and provided with the statue. A filtering option may also be provided in instances when more than one legal opinion (or other document) is used for the annotation.

As such, some embodiments disclosed herein may be configured as part of a back-end system and/or method to annotate a second electronic document with a portion of a first electronic document. Similarly, some embodiments are configured as a front-end system and/or method to receive user search criteria for the second electronic document and present the annotation with the second electronic document to the user. These systems and/or methods may additionally provide the user with filtering and/or other options for customizing display of the annotation.

Figure 1:
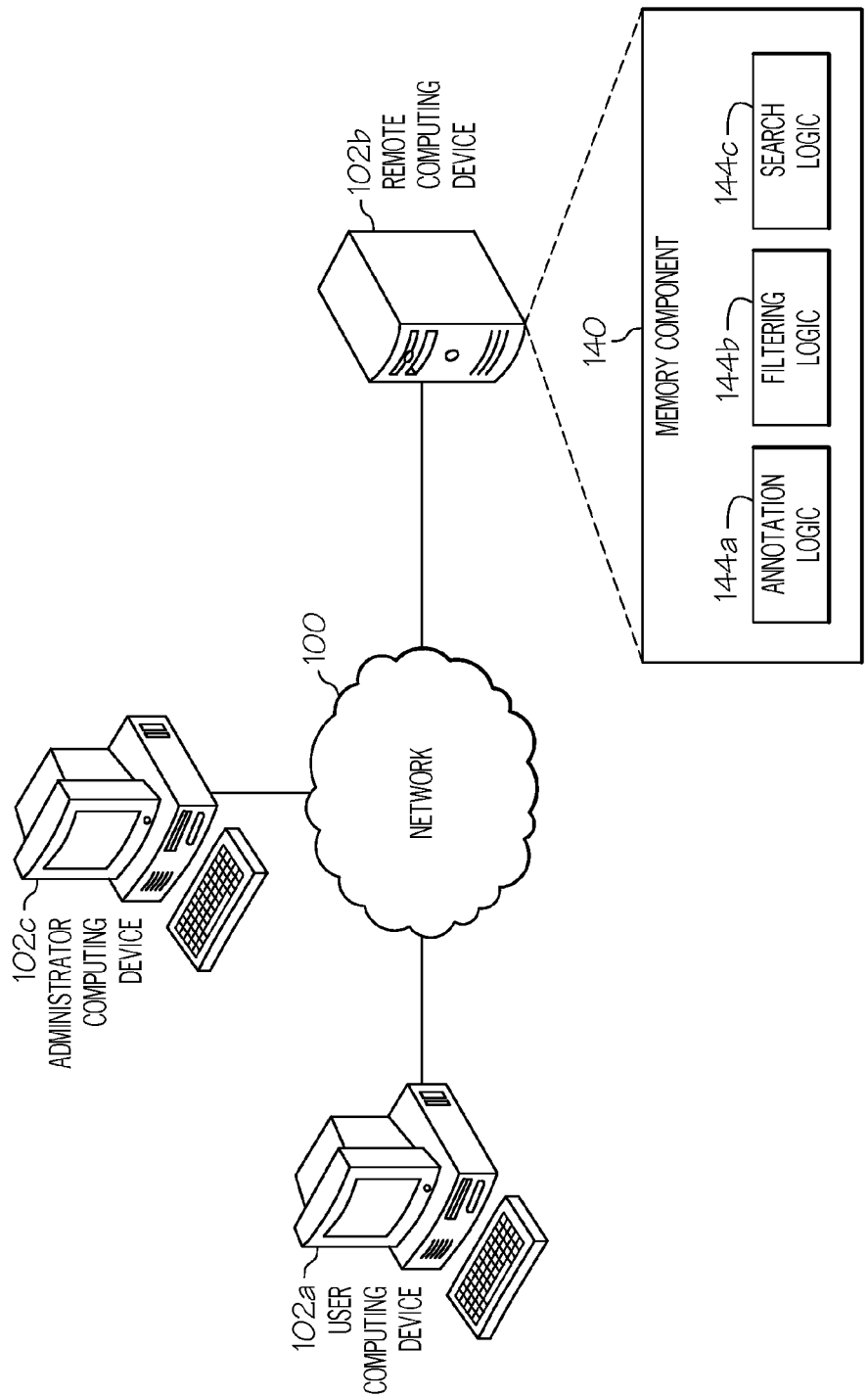
FIG. 1 depicts a computing environment for annotating a document, according to one or more embodiments shown and described herein.

Referring now to the drawings, FIG. 1 depicts a computing environment for annotating a document, according to one or more embodiments shown and described herein. As illustrated, a network 100 may be coupled to a user computing device 102a, a remote computing device 102b, and an administrator computing device 102c. The network 100 may include a wide area network and/or a local area network and thus may be wired and/or wireless. The user computing device 102a may include any portable and/or non-portable computing devices, such as personal computers, laptop computers, personal digital assistants (PDAs), mobile phones, etc.

Similarly, the remote computing device 102b may include a server and/or other computing device for providing information to the user computing device 102a and/or administrator computing device 102c. In some embodiments, the remote computing device 102b may be configured to annotate legal documents, filter the annotated legal documents, and provide an online research tool, such as a legal research website, individual research tool, business tool, etc. to provide those annotated documents. As discussed in more detail below, the remote computing device 102b may include a memory component 140 that stores annotation logic 144a, filtering logic 144b, and search logic 144c to provide this functionality. The annotation logic 144a may include software, hardware, and/or firmware for annotating legal documents. Similarly, the filtering logic 144b may include software, hardware, and/or firmware for filtering portions of the annotated documents. The search logic 144c may provide the results determined from the annotation logic 144a and the filtering logic 144b in a user interface, such as a legal research interface, as described in more detail below.

Additionally, the remote computing device 102b may communicate information with the administrator computing device 102c for maintenance, monitoring, and/or other administrative actions. The administrator computing device 102c may also be configured as a personal computer, server, PDA, mobile phone, etc.

It should be understood that while the user computing device 102a, the remote computing device 102b, and the administrator computing device 102c are represented in FIG. 1 each as a single component; this is merely an example. In some embodiments, there may be numerous different components that provide the described functionality. However, for illustration purposes, single components are shown in FIG. 1 and described herein.

Figure 2:
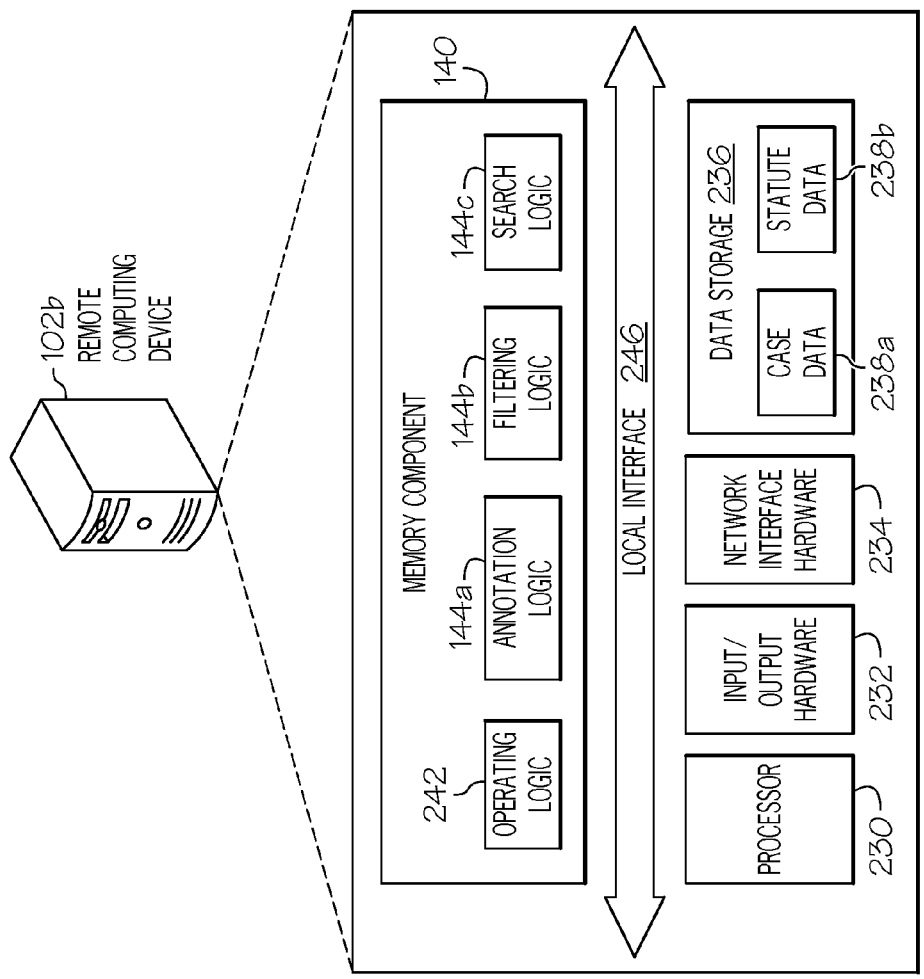
FIG. 2 depicts a remote computing device for annotating a document, according to one or more embodiments shown and described herein.

FIG. 2 depicts a remote computing device 102b for annotating a document, according to one or more embodiments shown and described herein. In the illustrated embodiment, the remote computing device 102b includes a processor 230, input/output hardware 232, network interface hardware 234, a data storage component 236 (which stores case data 238a, statute data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the remote computing device 102b and/or external to the remote computing device 102b.

Additionally, the memory component 140 may store operating logic 242, the annotation logic 144a, the filtering logic 144b, and the search logic 144c. The annotation logic 144a, the filtering logic 144b, and the search logic 144c may each include a plurality of different pieces of logic, each of which may be embodied as a computer program, firmware, and/or hardware, as an example. A local interface 246 is also included in FIG. 2 and may be implemented as a bus or other communication interface to facilitate communication among the components of the remote computing device 102b.

The processor 230 may include any processing component operable to receive and execute instructions (such as from the data storage component 236 and/or the memory component 140). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the remote computing device 102b and other computing devices.

The operating logic 242 may include an operating system and/or other software for managing components of the remote computing device 102b. Similarly, as discussed above, the annotation logic 144a may reside in the memory component 140 and may be configured to cause the processor 230 to annotate legal documents with portions of other legal documents. As an example, the annotation logic 144a may annotate a statute with court opinions that cite to that statute. Similarly, the filtering logic 144b may be utilized to filter annotations according to any of a plurality of criteria. The search logic 144c may cause the remote computing device 102b to provide searching functionality, such as for those legal documents. Other functionality is also included and described in more detail, below.

It should be understood that the components illustrated in FIG. 2 are merely exemplary and are not intended to limit the scope of this disclosure. While the components in FIG. 2 are illustrated as residing within the remote computing device 102b, this is merely an example. In some embodiments, one or more of the components may reside external to the remote computing device 102b. It should also be understood that, while the remote computing device 102b in FIG. 2 is illustrated as a single device, this is also merely an example. In some embodiments, the annotation logic 144a, the filtering logic 144b, and/or the search logic 144c may reside on different devices.

Additionally, while the remote computing device 102b is illustrated with the annotation logic 144a, the filtering logic 144b, and the search logic 144c as separate logical components, this is also an example. In some embodiments, a single piece of logic may cause the remote computing device 102b to provide the described functionality.

FIG. 3 depicts exemplary text 302 from a first electronic legal document, such as a court opinion, according to one or more embodiments shown and described herein. As illustrated, the first electronic legal document may include a court opinion, a brief, memorandum, motion, treatise, etc. As also illustrated, the first electronic legal document may refer to a statute (e.g., 17 USCS §101) or other second electronic legal document. Additionally, the first electronic legal document may include other commentary and/or information regarding the second electronic legal document, as described in more detail, below.

It should be understood that while FIG. 3 is provided herein to illustrate the exemplary text 302 that may be utilized for creating an annotation to the second electronic document, this may never be provided to an administrator or other user. As some embodiments for creating the annotation described herein may be performed without user interaction, it may be unnecessary to display this information. With that said, in some embodiments, the data of FIG. 3 (and/or FIGS. 4 and 5) could be provided to an administrator for oversight, troubleshooting, etc. Similarly, while some embodiments may be tailored for an online environment, this is also just an example. In some embodiments, the annotations described herein may be used to populate electronic systems (such as online research portals), print, and/or static e-book renditions of the same documents (such as print volumes of state statutes).

FIG. 4 depicts exemplary text 302 from the first electronic legal document, indicating various portions that may be used for an annotation, according to one or more embodiments shown and described herein. As illustrated, remote computing device 102b may identify, from the first electronic legal document of FIG. 3, portions of the first electronic legal document that refer to the second electronic legal document (e.g., 17 USCS §101 in FIGS. 3 and 4). More specifically, a reference citation 402 to the second electronic legal document may be identified. Once the reference citation 402 to the second electronic legal document has been identified, a classification 404 may be determined. The classification 404 may be a legal, technical, or other grouping utilized to organize portions of the first electronic legal document. The classification 404 may be created by the court that rendered the opinion, by the remote computing device 102b, and/or by the administrator computing device 102c. A document overview 406 may additionally be identified. The document overview 406 may also be created by the remote computing device 102b and/or administrator computing device 102c and may provide a summary of the court disposition and/or decision. A document citation 408 may also be identified and may include a history of the first electronic legal document, as well as other related legal documents. An interpretive note 410 may also be included and identified. The interpretive note 410 may indicate the crux of the relevant portion of the first electronic legal document.

Figure 5:
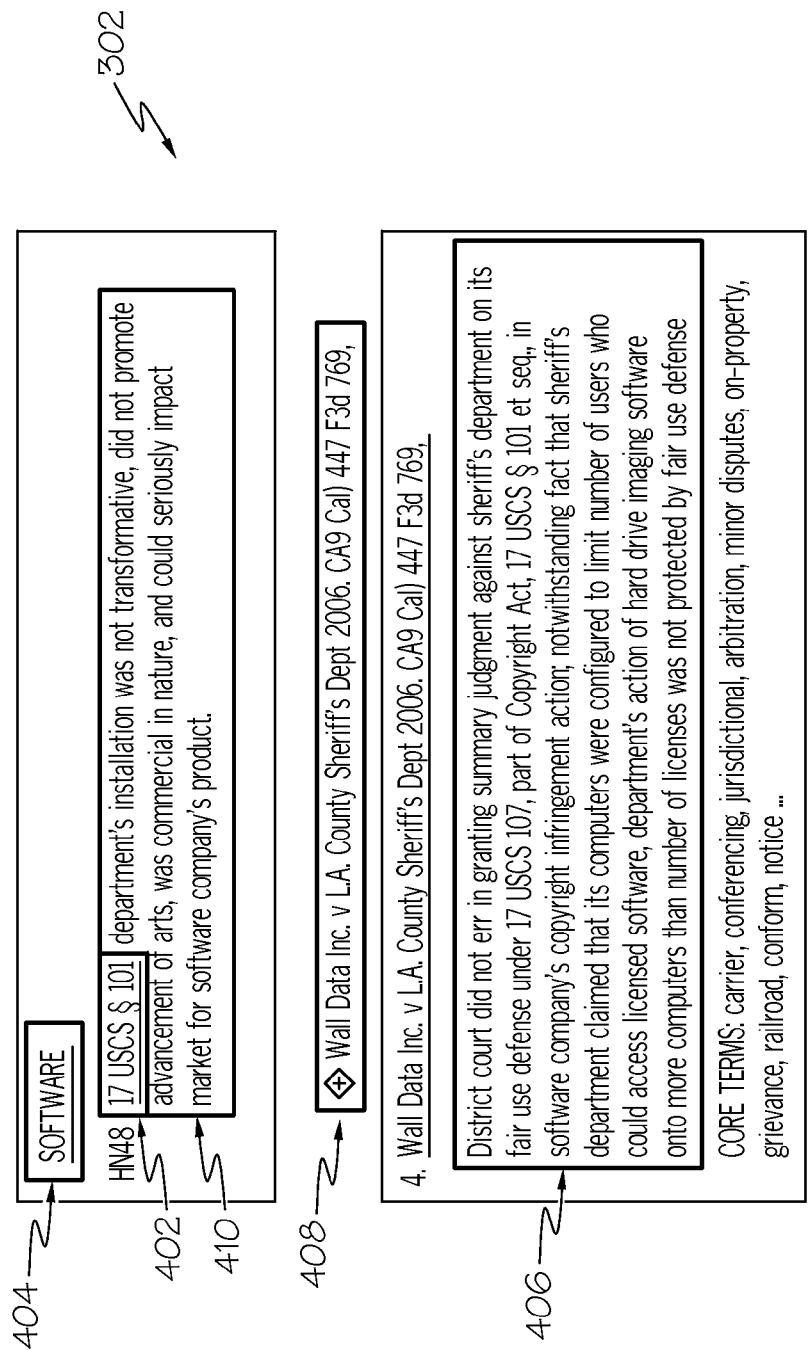
FIG. 5 depicts exemplary text from the first electronic legal document, demonstrating the organization of extracted portions of the first electronic legal document, according to one or more embodiments shown and described herein.

FIG. 5 depicts exemplary text 302 from the first electronic legal document, demonstrating the organization of extracted portions of the first electronic legal document, according to one or more embodiments shown and described herein. As illustrated, data identified from the exemplary text 302 from FIGS. 3 and 4 may be copied and/or extracted for inclusion as an annotation of the second electronic legal document. Upon a determination that the first electronic legal document refers to a second electronic legal document, the reference citation 402, the classification 404, the document overview 406, the document citation 408, and the interpretive note 410 may each be extracted and/or copied from the first electronic legal document. Additionally, at least a portion of these references may be organized and inserted as an annotation into the second electronic legal document, as described in more detail, below.

It should be understood that in determining whether the first electronic legal document refers to a second electronic legal document, some embodiments identify the reference citation 402 via a text search of the first electronic legal document. Once the reference citation 402 to the second electronic legal document has been identified, the classification 404 may be determined via a flag or other indicator provided with the first electronic legal document. More specifically, the remote computing device 102b may flag the classification 404 for searching and/or may store the flag separately from the legal opinion. As such, the remote computing device 102b may easily determine the classification 404 by accessing the stored flag. Similarly, the document overview 406 and the interpretive notes 410 may also be uniquely flagged and/or stored for easy location and retrieval. The document citation 408 may be determined in this manner and/or determined from a text search of the first electronic legal document.

It should be understood that, similar to FIGS. 3 and 4, the exemplary text of FIG. 5 may not be provided to an administrator or other user during creation of the annotation. As creation of the annotation may be performed without human intervention, such display may be unnecessary. However, in some embodiments this data may be provided to an administrator for oversight, troubleshooting, and/or for other purposes.

It should also be understood that once the relevant portions of the first electronic legal document have been copied and organized, this data may be associated with the second electronic legal document as an annotation. Additionally, embodiments disclosed herein may access a third electronic legal document (which may be another court opinion that may or may not be related to the first electronic legal document) and repeat the process described above for creating another annotation to the second electronic legal document. Depending on the particular embodiment, this process may continue numerous times, until the second electronic legal document is adequately annotated. Additionally, as discussed in more detail below, determinations for hiding and/or excluding data from the annotations may additionally be implemented.

Figure 6:
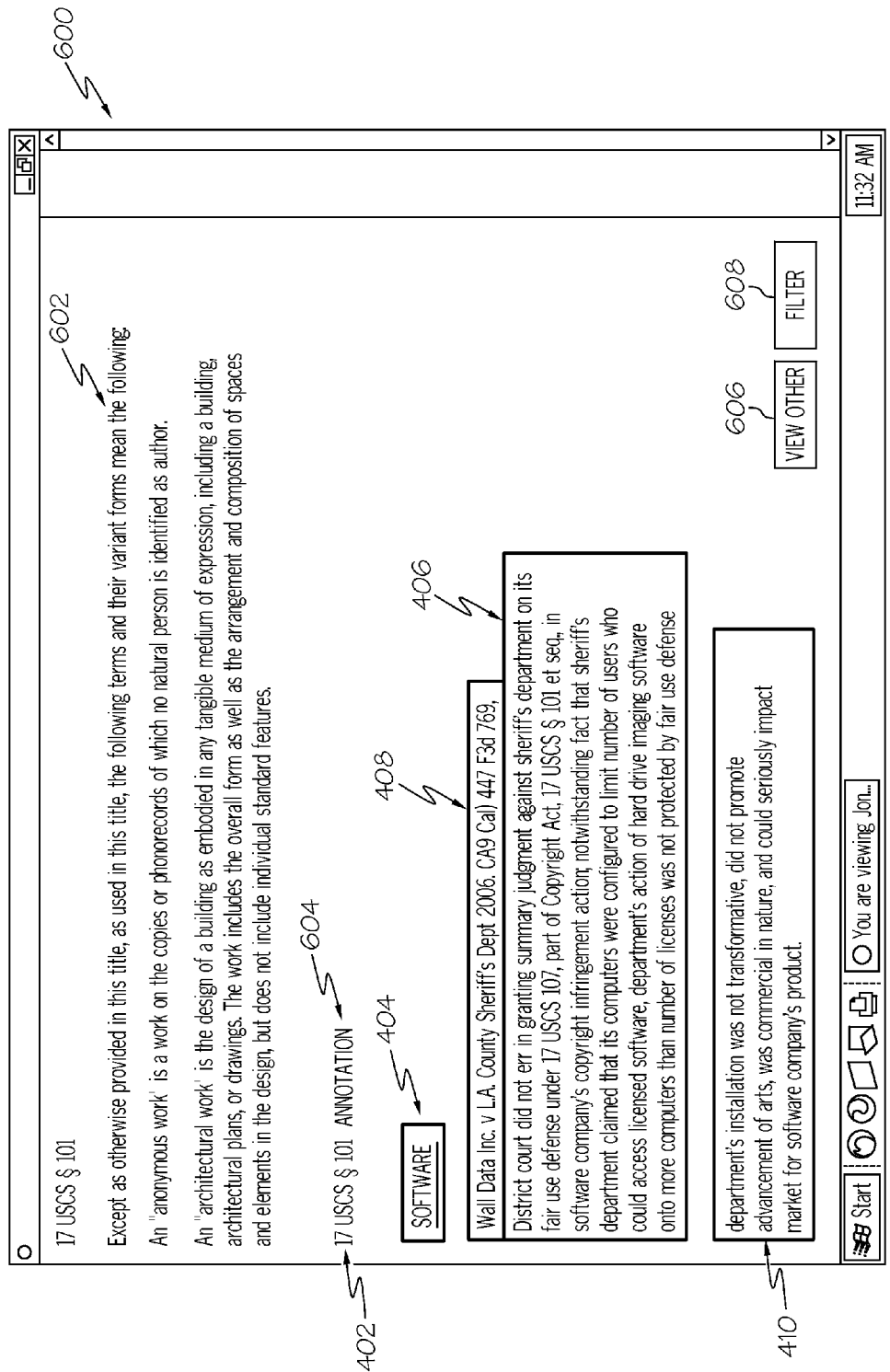
FIG. 6 depicts a front-end user interface for utilizing the various portions of the legal document as an annotation in a statute, according to one or more embodiments shown and described herein.

FIG. 6 depicts a front-end user interface 600 for utilizing the various portions of the legal document as an annotation 604 in a statute 602, according to one or more embodiments shown and described herein. As illustrated, in response to a user search for the statute 602, the remote computing device 102b may provide, to an end-user, the front-end user interface 600. The front-end user interface 600 includes the statute 602 with the annotation 604. The annotation 604 includes the reference citation 402, the classification 404, the document overview 406, the document citation 408, and the interpretive note 410, as discussed with respect to FIGS. 3-5.

Additionally, the front-end user interface 600 includes a "view other" option 606 for providing other annotations that may be related to this statute. More specifically, in some embodiments, the remote computing device 102b may extract data from a plurality of different "first electronic legal documents." However, as the number of documents may be quite large, the remote computing device 102b can present a subset of the first electronic legal documents as annotations in the front-end user interface 600. The view other option 606 may provide at least a portion of the remaining annotations.

As an example from FIG. 6, there may be numerous legal opinions that refer to the statute 17 USCS §101. As such, the remote computing device 102b can first determine which legal opinions include as an annotation to 17 USCS §101. The remote computing device 102b can then determine from those legal opinions, which follow valid case law, which are duplicative, which are most recent, etc. With this information, the remote computing device 102b can create the annotation 604 from the most accurate and/or relevant legal opinions. The less accurate legal opinions may be provided in response to a user selection of the view other option 606.

It should be understood that while the embodiment of FIG. 6 depicts the view other option 606 for providing other annotations, this is merely an example. Depending on the particular embodiment, the remote computing device 102b can provide the data from all "first electronic legal documents" that cite to the second legal document in a single interface. Similarly, in some embodiments, the remote computing device 102b can simply remove the less relevant "first electronic legal documents" from being included in the annotation. It should also be understood that while the annotation 604 and the statute 602 are provided together in the front-end user interface 600, this is also an example. In some embodiments, the annotation 604 and/or the statute 602 may be provided separately from the other.

Also included in FIG. 6 is a filter option 608. The filter option 608 may be configured to filter annotations according to any of a plurality of different criteria, as discussed below, with reference to FIG. 7.

It should be understood that in some embodiments, the first electronic document may make a plurality of references to the second electronic document and thus may include more than one interpretive note. Accordingly, some embodiments may be configured to create the annotation 604 so as to provide the reference citation 402, the classification 404, the document overview 406, and the document citation 408 with the interpretive note 410, where the interpretive note 410 includes each reference to the second electronic document in a single annotation. The interpretive note 410 may be configured as a dropdown menu and/or otherwise organized to provide the plurality of references in a single annotation.

Figure 7:
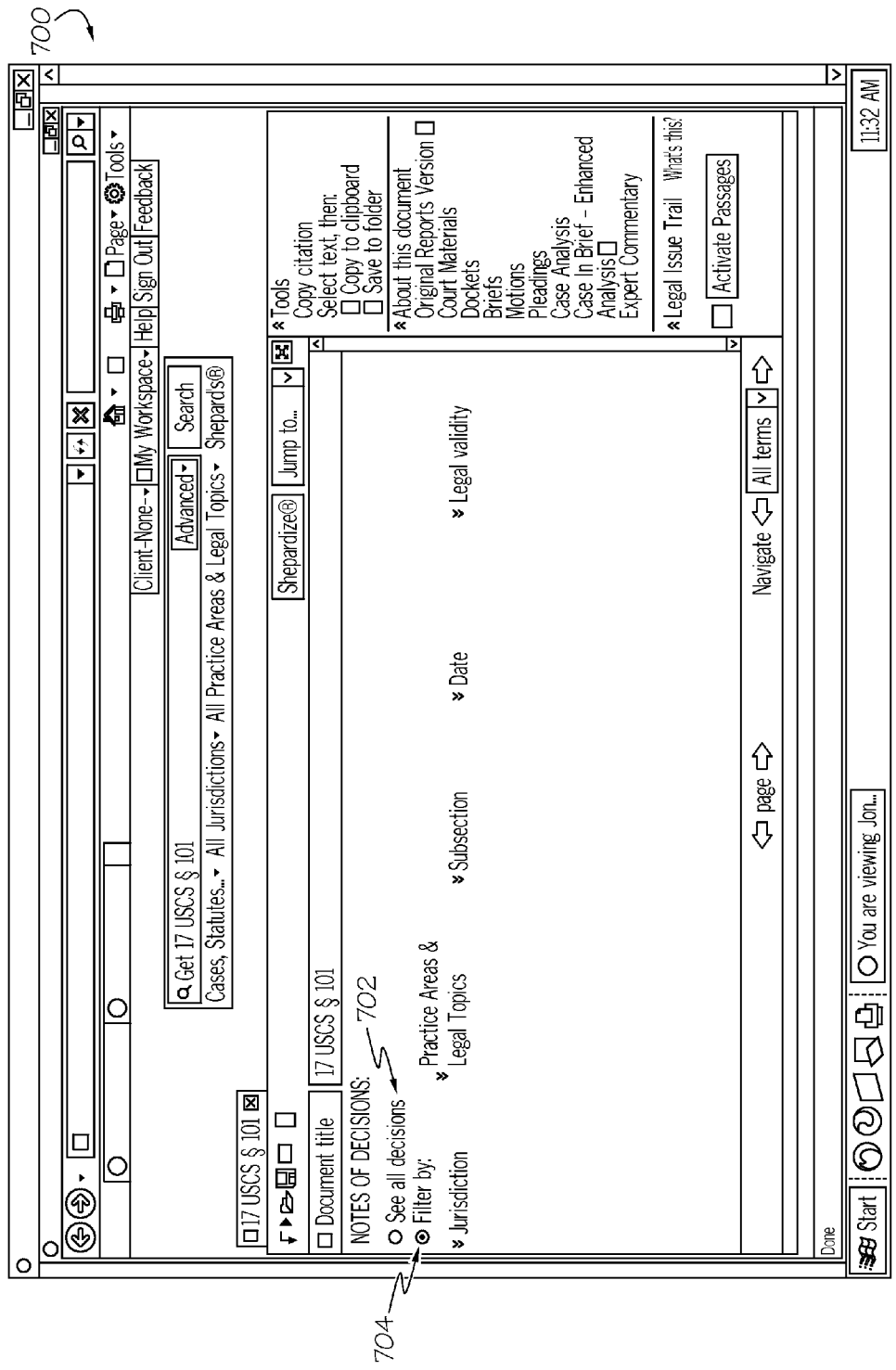
FIG. 7 depicts a front-end user interface for providing a plurality filtering options for filtering an annotation, according to one or more embodiments shown and described herein.

FIG. 7 depicts a front-end user interface 700 for providing a plurality filtering options for filtering an annotation, according to one or more embodiments shown and described herein. As illustrated, the front-end user interface 700 may be provided to an end-user in response to selection of the filter option 608 from FIG. 6. Accordingly, the front-end user interface 700 may include a "see all decisions" option 702 and a "filter by" option 704. Selection of the see all decisions option 702 may provide all annotations that are associated with the second legal document. However, as the number of citing legal documents may be large, the filter by option 704 may allow the annotations to be filtered by jurisdiction, practice areas and legal topics, subsection (of the second electronic legal document), by date, and a by legal validity signal, which indicates whether the legal document discusses a valid theory. Similarly, depending on the particular embodiment, other filtering criteria may also be included.

Figure 8:
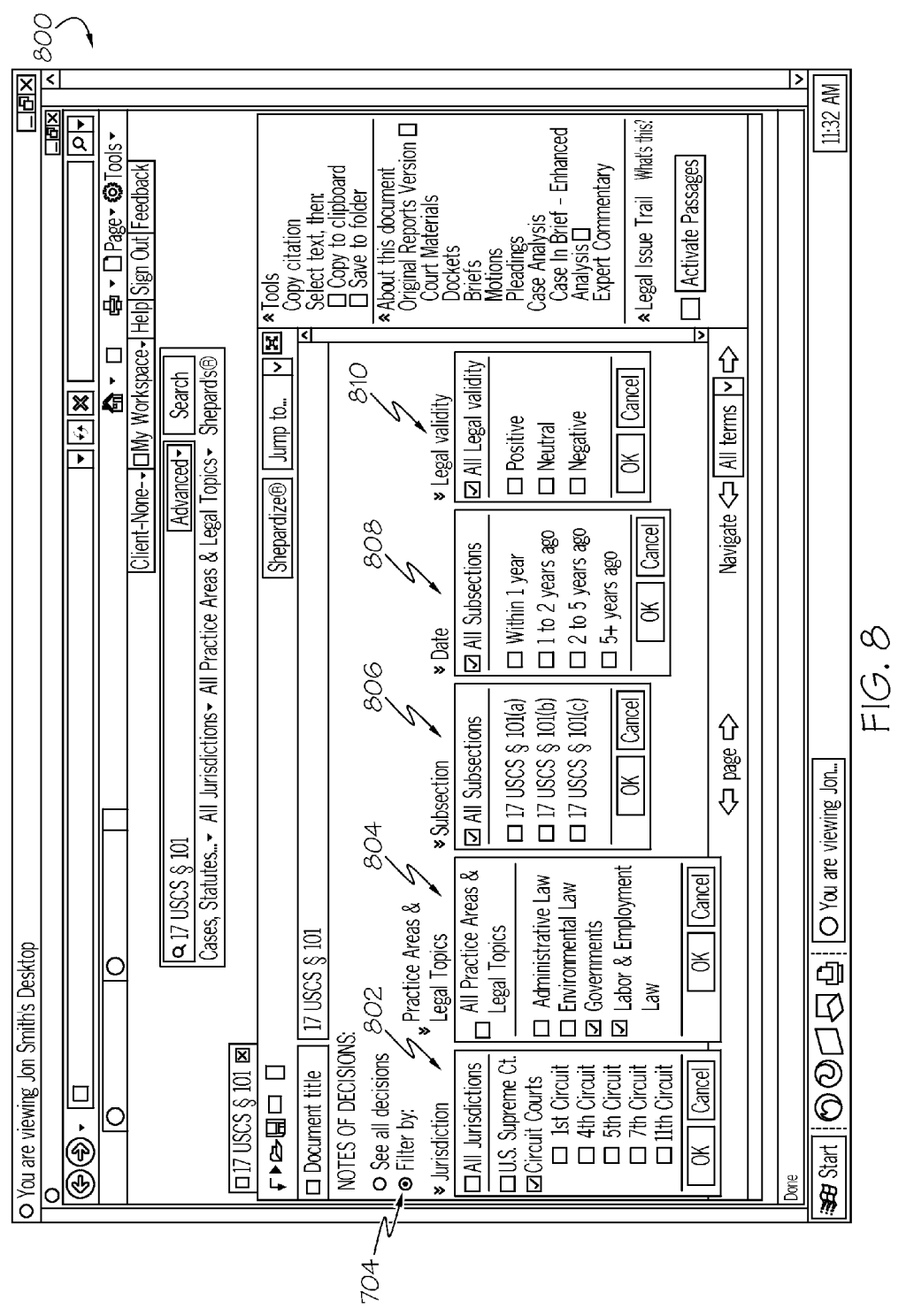

FIG. 8 depicts a front-end user interface 800 for providing a plurality of sub-options to the filter by option 704, according to one or more embodiments shown and described herein. As illustrated, the front-end user interface 800 may also be provided to an end-user and may include jurisdiction sub-options 802, practice areas and legal topics sub-options 804, subsection sub-options 806, date sub-options, and legal validity sub-options 810. The jurisdiction sub-options 802 may include options to select which court issued the legal document. The practice areas and legal topics sub-options 804 may include the areas of law that the legal opinion addresses. The subsection sub-options 806 may include the statute sub-section of the second document that the first document discusses. The date sub-options 808 may allow the user to select a date (or date range) of the first document. The legal validity option may allow the user to select whether the results are limited to valid law, questioned law, criticized law, overruled law, etc.

Figure 9:
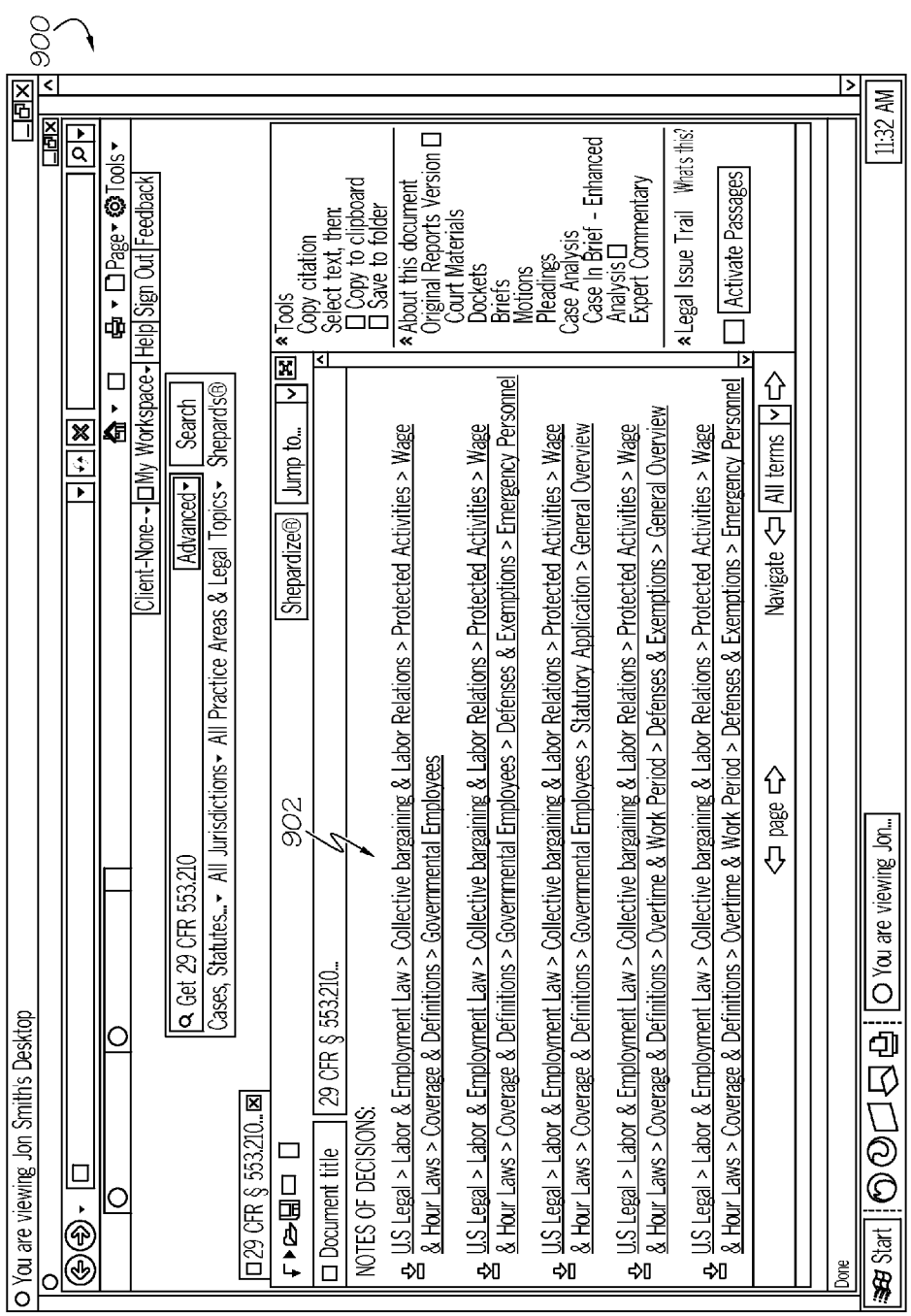
FIG. 9 depicts a front-end user interface for providing a navigatable table of contents for viewing legal documents and annotations, according to one or more embodiments shown and described herein.

FIG. 9 depicts a front-end user interface 900 for providing a navigatable table of contents 902 for viewing legal documents and annotations, according to one or more embodiments shown and described herein. As illustrated, the front-end user interface 900 may be provided to the end-user in response to the end-user performing a search for a legal document (such as 29 C.F.R. §553.210). In response, a hierarchy of options may be provided that includes links to the annotations for one or more legal documents listed in a table of contents 902. The entries of the navigatable table of contents 902 may be arranged according to the classification 404 (FIG. 4) and/or via another format. Each of the entries may be selectable such that a user may easily locate the corresponding annotation from the front-end user interface 900.

Figure 10:
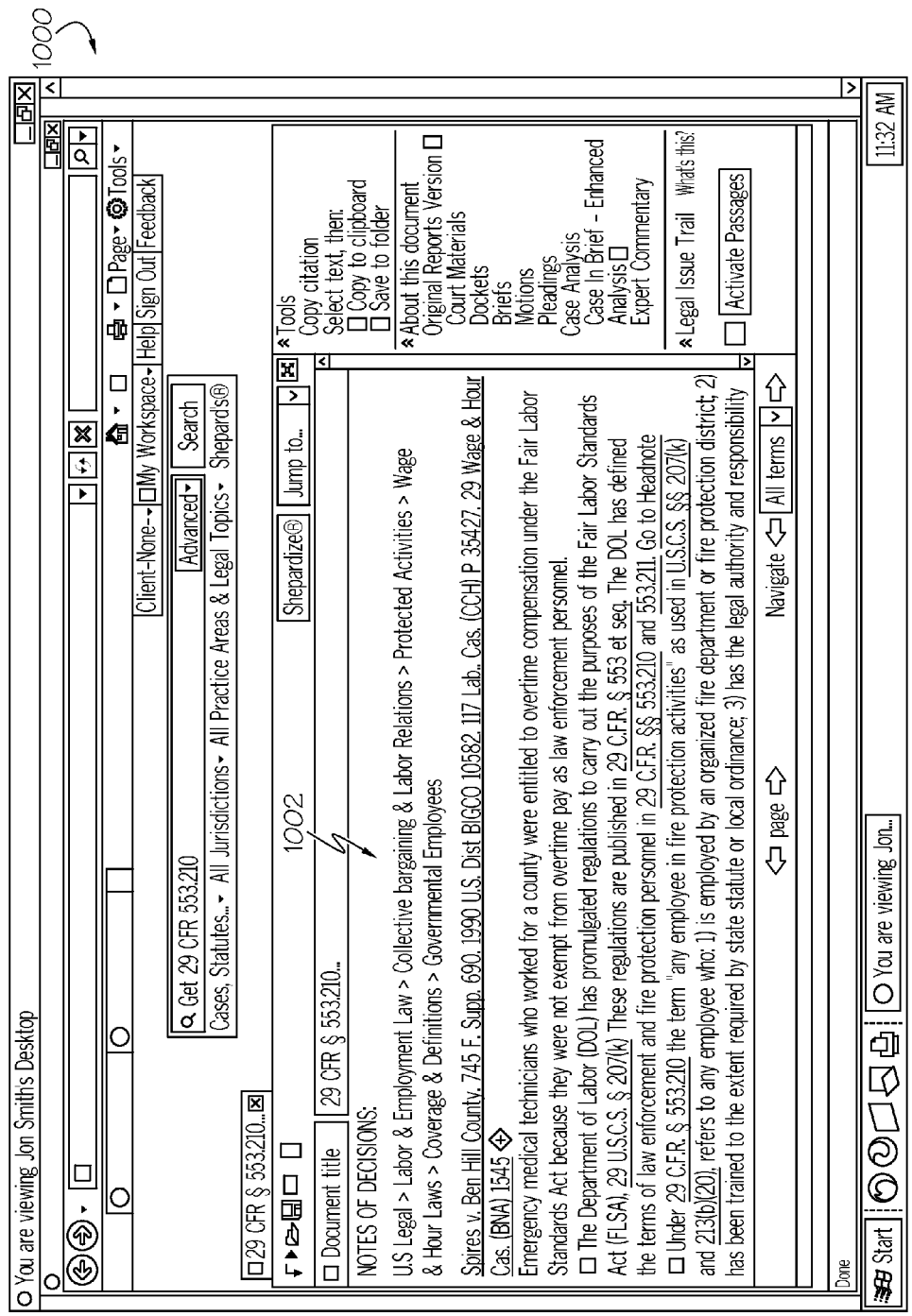
FIG. 10 depicts a front-end user interface that may be provided in response to a user selection of an entry from the navigatable table of contents, according to one or more embodiments shown and described herein.

FIG. 10 depicts a front-end user interface 1000 that may be provided in response to a user selection of an entry from the navigatable table of contents 902, according to one or more embodiments shown and described herein. As illustrated, in response to selecting one of the entries from the navigatable table of contents 902, the annotation 1002 may be provided. In some embodiments, the statute may be provided with the annotation, while in other embodiments, only the annotation is provided. Regardless, as discussed above, this format for providing the annotation provides the user with quick access to annotations to the second electronic legal document.

Figure 11:
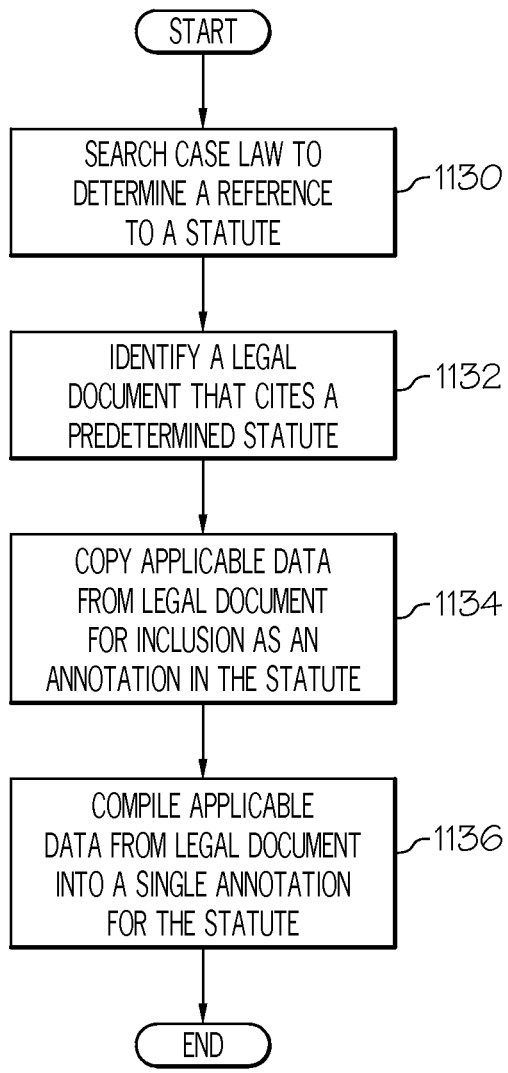
FIG. 11 depicts a flowchart for compiling applicable data from a legal document into a single annotation for a statute.

FIG. 11 depicts a flowchart for compiling applicable data from a legal document into a single annotation for a statute. As illustrated in block 1130, a plurality of legal documents may be searched to determine a reference to a statute. The legal document may include one or more headnotes, which may include a brief summary of a point of law that is created by the remote computing device 102*b* and identified within the legal document. In block 1132, a particular legal document may be identified as citing a predetermined statute. In block 1134, applicable data, such as reference citations, document citations, interpretive notes, document overviews, and classifications may be copied and/or extracted from the legal document for inclusion as an annotation into the statute. In block 1136, the applicable data may be compiled from the legal document into a single annotation for the statute.

Figure 12:
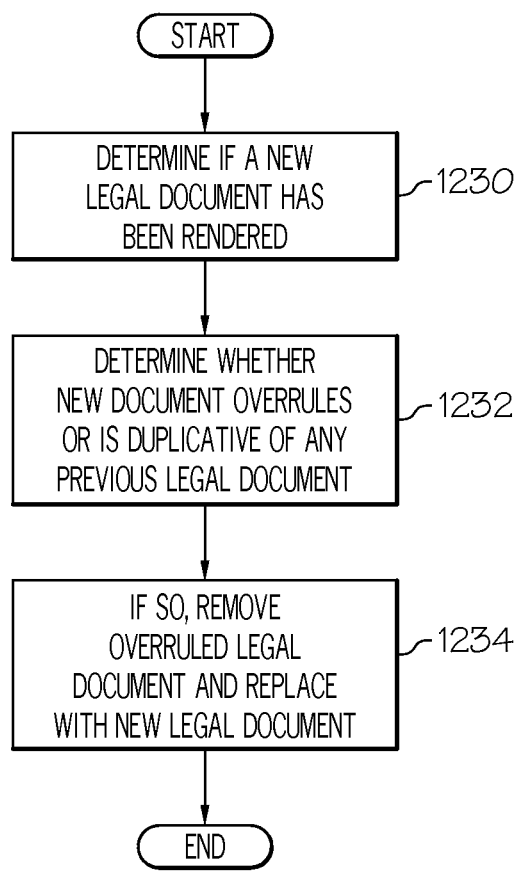
FIG. 12 depicts a flowchart for replacing an overruled and/or duplicative annotation with a newly rendered legal document, according to one or more embodiments shown and described herein.

FIG. 12 depicts a flowchart for replacing an overruled and/or duplicative annotation with a newly rendered legal document, according to one or more embodiments shown and described herein. In block 1230, a determination may be made regarding whether a new legal document as been rendered by a court or other authority. In block 1232, a determination may be made regarding whether the new legal document overrules or is duplicative of any previous legal document. In block 1234, if so, the overruled legal document may be removed as an annotation and may be replaced with the new legal document.

It should be understood that while FIG. 12 is directed to removing a duplicative and/or overruled legal document, this is merely an example. More specifically, in some embodiments, the overruled or duplicative cases may still be provided with an indication that the case is overruled or duplicative. Similarly, in some embodiments, the overruled or duplicative cases may be hidden, but an option to view the hidden cases may be provided. Further, in some embodiments different criteria may be utilized for determining duplicative and/or otherwise irrelevant documents. Other similar embodiments may also be implemented.

Figure 13:
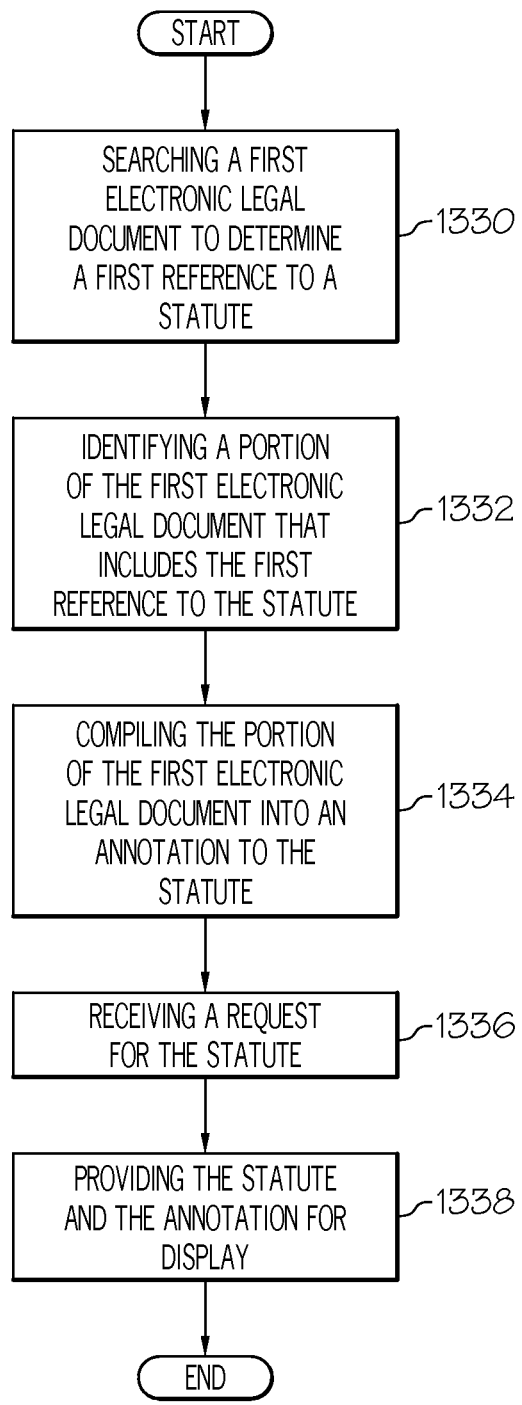
FIG. 13 depicts a flowchart for providing an annotated legal document, according to one or more embodiments shown and described herein.

FIG. 13 depicts a flowchart for providing an annotated legal document, according to one or more embodiments shown and described herein. As illustrated in block 1330, a first electronic legal document may be searched to determine a first reference to a statute. In block 1332 a portion of the first electronic document that includes the reference to the statute may be identified. In block 1334, the portion of the first electronic legal document may be compiled into an annotation to the statute. In block 1336, a request for the statute may be received, such as from a user query. In block 1338, the statute and annotation may then be provided for display.

It should be understood that in some embodiments, the statute and annotation may be stored for retrieval. In such embodiments, updating of the annotation may be performed periodically and/or upon determining that new authority has been rendered. Additionally, in some embodiments, the remote computing device 102*b* can dynamically generate annotations upon a user request of the statute. As such, the annotation in this embodiment may be current in terms of case law validity.

It should also be understood that while many of the embodiments described herein refer to legal documents, these are merely examples. Any electronic document may be utilized for creating an annotation for another legal document. Examples include technical documents, business documents, educational documents, medical documents etc.

As discussed above, embodiments disclosed herein provide a convenient mechanism for annotating electronic documents. More specifically, embodiments disclosed herein may be configured to determine whether a first electronic document, such as a court opinion, refers to a second electronic document, such as a statute. If the court opinion cites to the statute, data from the court opinion may be extracted and utilized in the statute as an annotation. As more court opinions (and other electronic documents) are searched in this manner, a determination may be made regarding what information from which court opinion(s) to include as the annotation. Depending on the particular embodiment, many the court opinions may be utilized as part of the annotation and/or a subset may be utilized. In some embodiments, a primary subset of the court opinions may be provided, with a user option to view the remaining documents. Similarly, in some embodiments, the user may filter results, based on any of a plurality of criteria.

Similarly, in some embodiments a previously compiled annotation may be updated with a new electronic document. In such an embodiment, the new electronic document may overrule the previously utilized electronic document or merely update the annotation. Regardless, in these embodiments, a determination may be made regarding whether a new electronic document has been rendered. If so, determinations may be made regarding whether to utilize the new electronic document in place of (or as a supplement to) the previous electronic document. If so, such replacement or supplementation may be made. Accordingly, embodiments disclosed herein may provide an efficient mechanism for automatically updating a previously annotated electronic document.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for creating an annotation from a document comprising:
    searching a first electronic legal document to determine a first reference citation to a statute depicted in a second electronic legal document, wherein a plurality of content classifications has been identified for the first electronic legal document based on technical subject matter content, wherein the plurality of content classifications identify respective content portions of the first electronic document;
    determining, from the plurality of content classifications, a technical content classification that describes content of the first electronic legal document associated with the first reference to the statute;
    identifying a content portion of the first electronic legal document that includes the first reference citation to the statute;
    copying the identified content portion of the first electronic legal document;
    annotating the second electronic legal document with a plurality of annotations, wherein the plurality of annotations includes a first annotation that includes the determined content technical classification, wherein the plurality of annotations includes a second annotation that includes at least a part of the copied identified content portion, and wherein annotating the second electronic legal document further comprises including an interpretive note associated with the identified content portion;
    providing, by a computing device, a user interface that includes the the annotated second electronic legal document and an option to filter annotation content being displayed in the second electronic legal document.

2. The method of claim 1, further comprising:
providing a user option for filtering the plurality of annotations;
receiving a selection of the user option; and
removing at least a portion of the plurality of annotations, according to the selection.

3. The method of claim 2, wherein the user option for filtering the plurality of annotations comprises an option for filtering according to at least one of the following criteria: jurisdiction, practice area and legal topic, a subsection of the statute, date, and legal validity signal.

4. The method of claim 1, wherein the first reference includes at least one of the following: a citation to a section of the statute, a document overview with disposition, an interpretive note, and a case citation with history.

5. The method of claim 1, further comprising:
searching a third electronic legal document for a second reference to the statute;
identifying a portion of the third electronic legal document that includes the second reference to the statute;
comparing the first reference to the statute with the second reference to the statute; and
in response to determining that the first reference to the statute is not similar to the second reference to the statute, copying the portion of the third electronic legal document for inclusion as part of a third annotation of the statute and compiling the portion of the third electronic legal document into the third annotation to the statute.

6. The method of claim 1, further comprising determining whether the first electronic legal document contains a valid legal theory and, in response to determining that the first electronic legal document does not contain the valid legal theory, removing the portion of the first electronic legal document from the plurality of annotations.

7. The method of claim 1, further comprising generating a navigatable table of contents for providing access to the statute and the plurality of annotations.

8. A system for creating an annotation from a document comprising:
a processor; and
a memory component that stores logic that, when executed by the processor, causes the system to perform at least the following:
receive a request for a second electronic document, the second electronic document having content;
determine whether content within a first electronic document includes a reference to the second electronic document, wherein the system previously identified a plurality of content classifications for the content of the first electronic document, wherein the plurality of content classifications identify respective content portions of the first document;
determine, from the plurality of content classifications, one of the content classifications as a technical content classification of the reference to the first electronic document;
in response to determining that the first electronic document references the second electronic document, identify a content portion of the first electronic document that contains the reference to the second electronic document and retrieve the identified content portion of the first electronic document for inclusion as a first annotation to the second electronic document;
annotate, the content of the second electronic document to include the first annotation, text describing the technical content classification, and an interpretive note associated with the identified content portion;
provide, a user interface comprising the annotated content of second electronic document; and
provide, a user interface upon request that includes the annotated second electronic document, a user-option to filter content being viewed for the annotated second electronic document by filtering the first annotation according to user-defined criteria, and the determined technical classification.

9. The system of claim 8, wherein the logic further causes the system to perform at least the following:
determine whether a third electronic document references the second electronic document, wherein the system previously identified a plurality of classifications of the third electronic document based on technical subject matter, wherein the plurality of classifications identify respective portions of the third electronic document;
determine whether the third electronic document is duplicative of the first electronic document; and
in response to determining that the third electronic document is not duplicative of the first electronic document, determining whether the classification of the first electronic document is similar to the classification of the third electronic document and, in response to determining that the classification of the first document is similar to the classification of the third electronic document, additionally include at least a portion of the third electronic document in the annotation, and arrange the portion of the first electronic document and the portion of the third electronic document according to classification.

10. The system of claim 9, wherein the logic further causes the system to refrain from including the third electronic document into the annotation in response to a determination that the third electronic document is duplicative with a portion of the first electronic document.

11. The system of claim 8, wherein the user-defined criteria comprises at least one of the following: jurisdiction, practice area and legal topic, a subsection of the statute, date, and legal validity signal.

12. The system of claim 8, wherein the first electronic document comprises at least one of the following: a citation to a section of the second electronic document, an overview of the first electronic document with disposition, and a citation of the first electronic document with history.

13. The system of claim 8, wherein the logic further causes the system to determine whether the first electronic document contains a valid legal theory and, in response to determining that the first electronic document does not contain the valid legal theory, removing the portion of the first electronic document from the annotation.

14. The system of claim 8, wherein the logic further causes the system to generate a navigatable table of contents for providing access to the second electronic document and the annotation.

15. A system for creating annotations from a plurality of documents, comprising:
a processor; and
a memory component that stores logic that, when executed by the processor, causes the system to perform at least the following:
search a first electronic document to determine a first reference to a second electronic document, wherein the system previously identified a plurality of classifications of the first electronic document based on technical subject matter, wherein the plurality of classifications identify respective portions of the first electronic document;

identify a portion of the first electronic document that includes the first reference to the second electronic document;

determine from the plurality of classifications, a technical classification of the first reference to the second electronic document and an interpretive note, wherein the technical classification is determined via an indicator provided in the first electronic document;

copy the portion of the first electronic document for inclusion as a first annotation to the second electronic document;

compile the portion of the first electronic document into the first annotation to the second electronic document;

search a third electronic document to determine a second reference to the second electronic document;

identify a portion of the third electronic document that includes the second reference to the second electronic document;

copy the portion of the third electronic document for inclusion as a second annotation to the second electronic document;

compile the portion of the third electronic document into the second annotation to the second electronic document; and provide a user interface that includes at least a portion of the second electronic document, the first annotation, the second annotation, the technical classification, and a filtering option for filtering the first annotation and the second annotation, wherein the user interface further provides a user annotation option to view additional, less relevant annotations to the second electronic document.

16. The system of claim 15, wherein the logic further causes the system to perform at least the following:
provide a user option for filtering the first annotation and the second annotation;
receive a selection of the user option; and
remove at least one of the following, according to the selection: the first annotation and the second annotation.

17. The system of claim 16, wherein the second electronic document is a legal document and wherein the user option for filtering the first annotation and the second annotation comprises an option for filtering according to at least one of the following criteria: jurisdiction, practice area and legal topic, a subsection of the second electronic legal document, date, and legal validity signal.

18. The system of claim 15, wherein the first reference includes at least one of the following: a citation to a section of the second electronic document, an overview of the first electronic document, and a citation of the first electronic document with history.

19. The system of claim 15, wherein the logic further causes the system to remove the portion of the third electronic document from the annotation in response to determining that the portion of the third electronic document is duplicative with a portion of the first electronic document.

20. The system of claim 15, wherein the logic further causes the system to determine whether the third electronic document contains a valid theory and in response to determining that the third electronic document does not contain the valid theory, removing the portion of the third electronic document from the annotation.

* * * * *

UNITED STATES PATENT AND TRADEMARK OFFICE
CERTIFICATE OF CORRECTION

PATENT NO. : 9,122,666 B2
APPLICATION NO. : 13/177884
DATED : September 1, 2015
INVENTOR(S) : Kerry-Tyerman et al.

Page 1 of 1

It is certified that error appears in the above-identified patent and that said Letters Patent is hereby corrected as shown below:

Claims

Col. 10, Claim 1, Line 67
Change "includes the the annotated second electronic legal docu-" to
-- includes the annotated second electronic legal docu- --

Col. 12, Claim 8, Line 7
Change "provide, a user interface upon request that includes the" to
-- provide a user interface upon request that includes the --

Signed and Sealed this
Nineteenth Day of January, 2016

Michelle K. Lee
*Director of the United States Patent and Trademark Office*